United States Patent [19]

Hamlin et al.

[11] Patent Number: 4,543,109
[45] Date of Patent: Sep. 24, 1985

[54] MOLECULAR SIEVE TYPE GAS SEPARATION SYSTEMS

[75] Inventors: Humphrey A. S. Hamlin; James C. Taylor, both of Somerset, England

[73] Assignee: Normalair-Garrett (Holdings) Limited, Somerset, England

[21] Appl. No.: 595,304

[22] Filed: Mar. 30, 1984

[30] Foreign Application Priority Data

Mar. 31, 1983 [GB] United Kingdom ............... 8308948

[51] Int. Cl.$^4$ ............................................ B01D 53/04
[52] U.S. Cl. ............................................. 55/25; 55/62; 55/68; 55/75; 55/161; 55/179; 55/389
[58] Field of Search ............... 55/18, 21, 25, 26, 62, 55/68, 74, 75, 161–163, 179, 387, 389

[56] References Cited

U.S. PATENT DOCUMENTS

| 3,533,221 | 10/1970 | Tamura | 55/62 X |
| 3,923,477 | 12/1975 | Armond et al. | 55/25 |
| 3,986,849 | 10/1976 | Fuderer et al. | 55/25 |
| 4,315,759 | 2/1982 | Benkmann | 55/18 |
| 4,321,069 | 3/1982 | Ritter | 55/161 |
| 4,386,945 | 6/1983 | Gardner | 55/26 |
| 4,449,990 | 5/1984 | Tedford, Jr. | 55/26 |

FOREIGN PATENT DOCUMENTS

| 80300 | 6/1983 | European Pat. Off. | 55/179 |
| 24517 | 2/1980 | Japan | 55/25 |
| 2029257 | 3/1980 | United Kingdom | 55/21 |
| 2066693 | 7/1981 | United Kingdom | 55/163 |

Primary Examiner—Robert Spitzer
Attorney, Agent, or Firm—Larson and Taylor

[57] ABSTRACT

In supplying a high volume flow of oxygen-enriched air from a molecular sieve type gas separation system, two sets of molecular sieve beds are coupled in parallel. The beds and of each bed set are cyclically subjected to a charge/adsorption on-stream phase followed by a purge/desorption regeneration phase and are controlled to operate in overlapping sequence with respect to each other. At the same time the corresponding beds are controlled to operate in antiphase relationship to each other.

4 Claims, 5 Drawing Figures

MOLECULAR SIEVE TYPE GAS SEPARATION SYSTEMS

This invention relates to gas separation systems utilising molecular sieves and is especially but not exclusively concerned with the employment of such systems in the aviation field for obtaining oxygen-enriched air as a breathable gas for aircrew.

A common manner of operating a molecular sieve type gas separation system employing one or more molecular sieve beds involves charging the or each bed with feed gas mixture—e.g. air—under pressure and continuing the feed to the bed to maintain the charge pressure during delivery of the required product gas constituent(s) to use or storage. When the bed approaches saturation, the feed is discontinued and the bed vented to release the charge pressure, whereafter the bed is purged. The pressurising of the sieve bed promotes adsorption of the constituents to be retained by the bed, while the subsequent depressurising promotes desorption of the retained constituents to facilitate flushing of these from the bed.

In aircraft applications it is normally required that the oxygen concentration (partial pressure) in the breathable gas supplied to aircrew shall be related to cabin altitude, i.e. to the ambient pressure obtaining within their enclosure.

Originally in proposed aircraft applications of molecular sieve type gas separation systems, such systems were treated as a source of substantially pure oxygen to be utilised in the manner traditional in aircrew breathable gas supply systems: that is to say, the substantially pure oxygen product gas delivered by the separation system is proposed to be diluted with air to provide a breathable gas mixture of the required oxygen partial pressure, in a manner analogous to the utilisation of the oxygen obtained from sources such as high pressure storage bottles and liquid oxygen converters.

The utilisation of a product gas that is substantially pure oxygen for producing oxygen-enriched air as breathable gas involves the use of appropriate mixing valves and related control devices to derive the desired breathable gas mixture. Such valves and control devices tend to be heavy and to be potentially unreliable through their inclusion of capsules and the like for sensing ambient pressure changes.

It has been proposed, therefore, to operate such a sieve system to produce a breathable gas of the required oxygen partial pressure directly from the molecular sieve system rather than by downstream dilution.

One embodiment of this concept disclosed in GB-A-2,029,257 (Linde) is a method of producing breathable gas having an oxygen concentration dependent on altitude, comprising obtaining the total volume of breathable gas required in normal continuous service solely by the controlled adsorptive removal of nitrogen from compressed air by means of reversible adsorbers operated in a cycle comprising adsorption and reverse desorption phases. The adsorbers are so operated that, during each adsorption phase, a continuously increasing proportion of nitrogen passes through to the outlet end of the adsorber on-stream and the oxygen concentration of the breathable gas formed is adjusted within permissible range in accordance with the cabin pressure by controlling the amount of gas flowing through the adsorbers and/or the ratio of adsorption to desorption pressure.

In another embodiment of this concept, disclosed in EP-A-0,046,369 (Normalair-Garrett), control means responsive to the composition of the product breathable gas are adapted to control regeneration of the adsorber beds to maintain delivery of a product gas having the desired oxygen partial pressure. The control means particularly controls vent valve means for control of the regeneration phase and may also utilise a microprocessor to provide a variety of other useful system functions.

The system disclosed in EP-A-0,046,369 was originally envisaged primarily for use on advanced high performance combat aircraft, possibly with development potential still to be realised, so that the scope accorded by microprocessor-based control was not out of place and, indeed lends itself to the introduction of more advanced life support systems. However, with the potential use of molecular sieve type gas separation systems in more cost-conscious aircraft such as trainers, attention has turned to the attraction of minimal ground servicing.

A system meeting this requirement, is disclosed in EP-A-0,080,300 (Normalair-Garrett) and has control means comprised by a fixed logic sequencer controlling the sequential operation of charge and vent valves for cyclically subjecting each sieve bed to a charge/adsorption on-stream phase followed by a purge/desorption regeneration phase. The control means provide that during the regeneration phase the gas pressure in a sieve bed at least substantially equals the ambient atmospheric pressure or a pressure related thereto and that for a predetermined range of ambient atmospheric pressure the overall cycle time and the relative durations of said phases are fixed at values such that the oxygen content of air delivered to the outlet remains within physiologically acceptable limits for breathing.

We are now concerned to provide a system which will supply higher volume flow than the system disclosed in EP-A-0,046,369 and EP-A-0,080,300 so as to meet a requirement for supplying oxygen-enriched air from an on-board molecular sieve type gas separation system to the crew of large aircraft.

It was first proposed to meet this requirement from two separate three-bed systems each supplying oxygen-enriched air to a half of the aircrew. However, a requirement that the oxygen-enriched air be supplied from a common outlet led us to link the two sets of beds together and a proposal for sequential and overlapping control of the beds led to unexpected and advantageous results.

According to the present invention a molecular sieve type gas separation system adapted to deliver oxygen-enriched air to an outlet by decreasing the nitrogen content of air fed into the system is characterised by at least one parallel-coupled pair of sieve bed sets, and control means for cyclically subjecting each sieve bed to a charge/adsorption on-stream phase followed by a purge/desorption regeneration phase in such a manner that the sieve beds of the respective bed sets of the pair are controlled to operate in overlapping sequence with respect to each other, and corresponding sieve beds of the bed sets of the pair to operate substantially in antiphase with respect to one another.

The control means preferably comprises a multi-channel solid state sequencer controlling the sequential operation of charge and vent valves associated with each bed.

The durations of the charge/adsorption phase and the purge/desorption phase, in the operating cycle of a bed, are preferably in the ratio of 1:1.

In the regeneration phase it is preferable for obtaining best efficiency that the bed be opened to the lowest available pressure which will normally be ambient atmospheric pressure; however, the bed may be opened to cabin pressure which is directly related to ambient atmospheric pressure.

A molecular sieve type gas separation system in accordance with one embodiment of the present invention is characterised by two three-bed sets coupled in parallel, and control means for controlling the three beds of each bed set to operate in an overlapping sequence with respect to each other, the control means further controlling the first, second and third beds of one of the bed sets to operate in antiphase to the corresponding first, second and third beds of the other bed set, the cyclic operation of each bed providing a charge/adsorption on-stream phase followed by a purge/desorption regeneration phase, each bed being arranged to be open to ambient atmospheric pressure or a pressure related thereto during the regeneration phase.

Such an embodiment has been found on test to give improved oxygen concentration and lower outlet pressure swings in comparison with the same parallel-coupled three-bed sets operated with the bed cycles of one bed set in phase and synchronised with those of the corresponding beds of the other bed set.

The invention will now be further described by way of example and with reference to the accompanying drawings in which.

Figure 1:
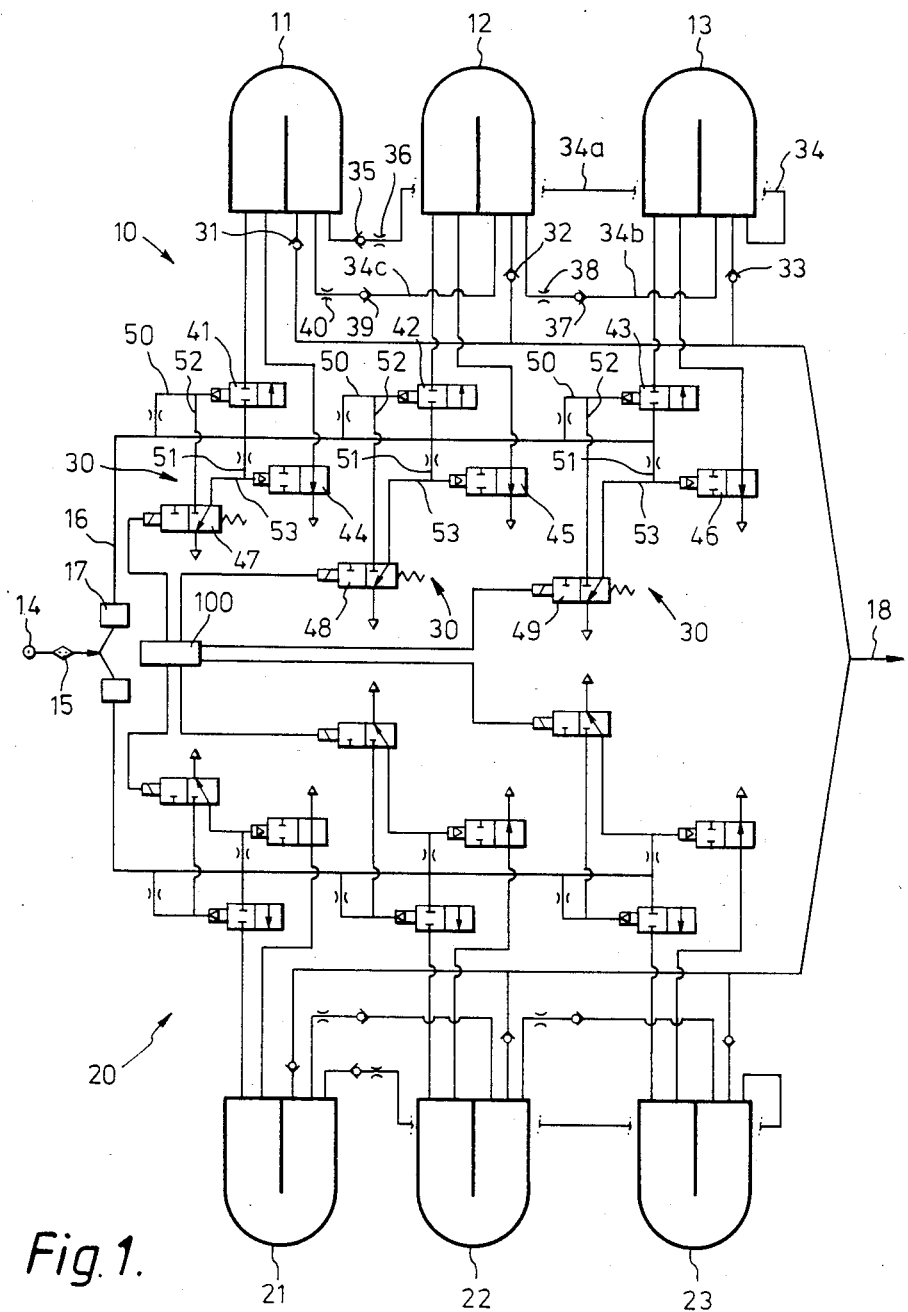
FIG. 1 is a schematic representation of a molecular sieve gas separation system comprising a parallel-coupled pair of sieve bed sets, suitable for aircraft.
Figure 4:
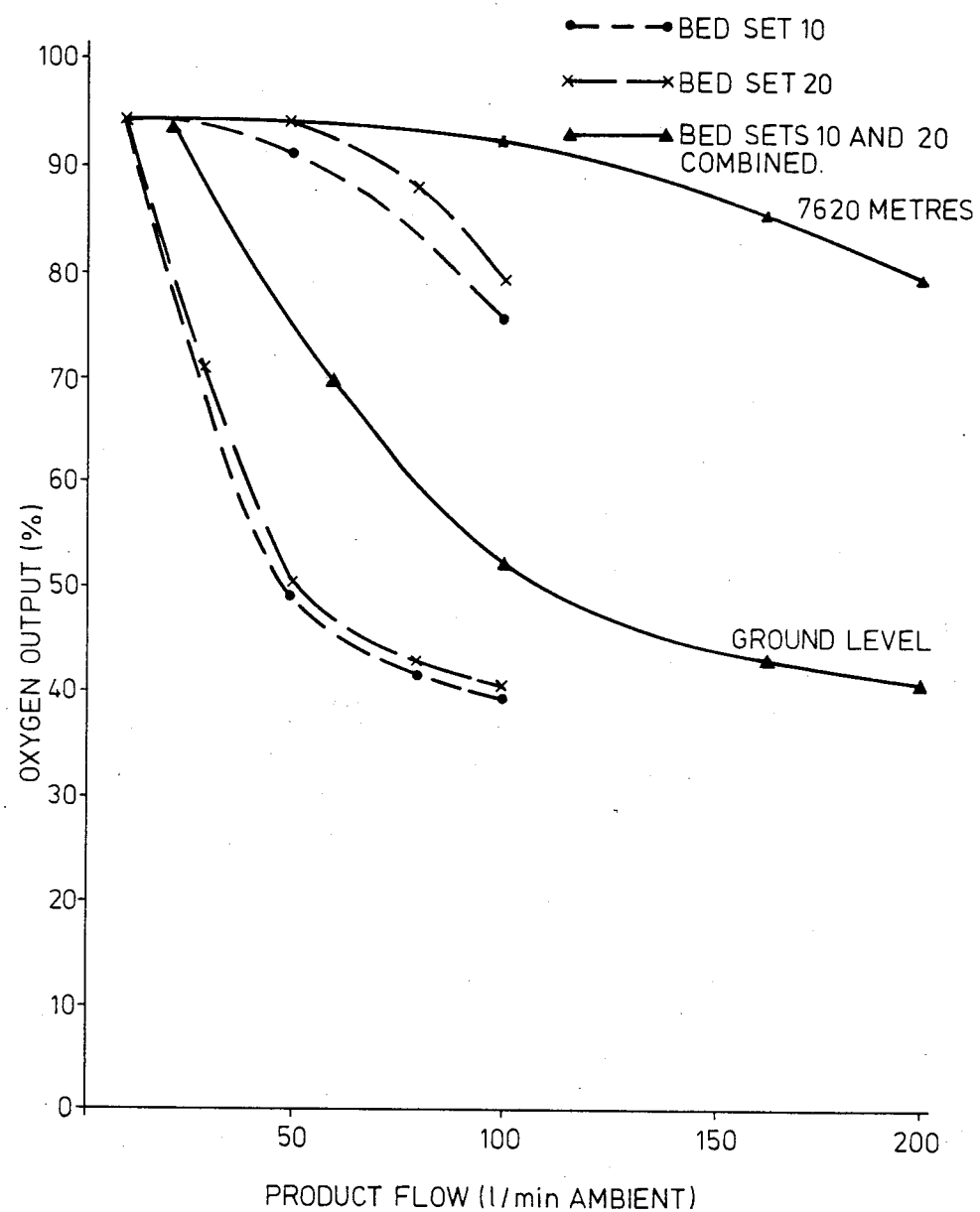
Figure 5:
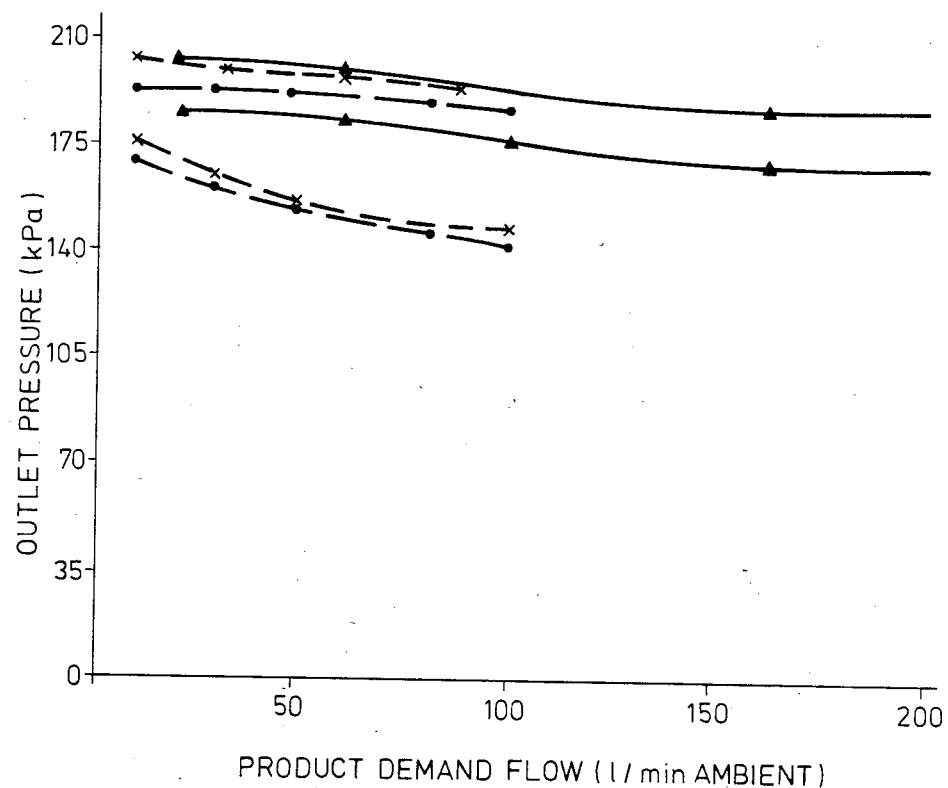

FIG. 4 graphically illustrates product flow and oxygen concentration of the bed sets of FIG. 1, both when operated individually and when operated coupled in antiphase, at ground level and at 7,620 meters (25,000 feet); and FIG. 5 graphically illustrates product pressure fluctuation of the bed sets of FIG. 1 at 7,620 meters (25,000 feet), both when operated individually and when operated coupled in antiphase.

Referring now to FIG. 1, a preferred molecular sieve type gas separation system for supplying oxygen-enriched air to the several aircrew members of a large aircraft includes, in accordance with one embodiment of the invention, two similar bed sets 10 and 20 each comprising three molecular sieve beds 11, 12, 13 and 21, 22, 23, respectively, suitably contained and arranged to receive atmospheric air from a source 14, such as a compressor stage of an engine of the aircraft, so as to deliver product gas in the form of air that is increasingly enriched with oxygen as the operating altitude increases. The two bed sets 10, 20 are coupled in parallel to the source 14 through a filter 15 by way of a bifurcated supply line 16, each leg of which includes a pressure regulating valve 17. The product outlets of the two sets are conjoined to a single delivery line 18 for delivery of product gas to suitable demand regulator means (not shown and forming no part of this invention).

The associated components and method of operation of one bed set are similar to those of the other and, therefore, the components and operation of only one bed set, 10 will be described in detail.

The individual sieve beds 11, 12, 13 of the bed set 10 are arranged for receiving compressed air from the supply line 16 under the control of three similar valve arrangements 30 and in this embodiment are suited to the adsorption of nitrogen by use of a Type 5A molecular sieve material as available from Bayer AG or Union Carbide Corporation, while passing oxygen so that the product gas delivered to the delivery line 18 is oxygen-enriched air having an oxygen concentration, or partial pressure, determined by the operation of the system as explained hereinafter.

The sieve beds 11, 12, 13 are connected to the delivery line 18 by way of check, or non-return valves 31, 32, 33, respectively, and are also connected in series, one to another, by a purge loop 34. Between beds 11 and 13, in section 34a of the loop 34, is included a check valve 35 upstream of a flow regulating orifice 36; in section 34b between beds 13 and 12 a check valve 37 is positioned upstream of a flow regulating orifice 38 and, likewise, in section 34c between beds 12 and 11 a check valve 39 is positioned upstream of a flow regulating orifice 40. The check valves 35, 37, 39 in the purge loop are not essential although their inclusion permits a slightly higher oxygen concentration to obtain in the product gas than obtains when they are omitted.

Each valve arrangement 30 controls a charge inlet port and a vent port of a single sieve bed and comprises a charge valve and a vent valve of similar construction controlled by a servo valve. Thus the sieve beds 11, 12, 13 are connected to the supply line 16 via charge valves 41, 42, 43, respectively, and to ambient atmospheric pressure or to a pressure directly related thereto via vent valves 44, 45, 46, respectively.

The servo chambers of the valves constituting each pair of charge and vent valves 41/44, 42/45 and 43/46, are connected to the supply line 16 and also to an individual servo valve associated with each respective pair of charge and vent valves: that is, solenoid operated bleed switching valves, 47, 48, 49, are connected to the servo chambers of the valves of the valve pairs 41/44, 42/45 and 43/46, respectively. Each switching valve 47, 48, 49, is actuated by a sequencer unit 100 having an operating ratio of 1:1. The switching valves 47, 48, 49, serve the pairs of charge and vent valves 41/44, 42/45, and 43/46, respectively, in such a manner that while a charge valve is open its companion vent valve is closed and vice versa, and the sequencer is so connected as to cause the open period of the charge valves to be equal to that of the vent valves. The cross-sectional area of the vent flow paths from the sieve beds to ambient is greater than the corresponding area of the supply air flow path into the beds.

In this embodiment it is preferred that the charge valves 41, 42, 43 and the vent valves 44, 45, 46 are of the resilient diaphragm type (not illustrated structurally), and are arranged for their diaphragms to be pressure closed upon their valve seats by supply pressure fed to their servo chambers via restricted ducts 50, 51, respectively, and for relief of these servo chambers via unrestricted ducts 52, 53, respectively. The check valves 31, 32, 33 and 35, 37, 39 may be of any suitable form, such as those using a perforated diaphragm or a flap.

The sieve beds 11, 12, 13 may be of any profile and form suitable to the system and available space envelope. However in this embodiment the base plate of each bed is provided with a charge port and a vent port positioned to one side of an internal bed-divider wall, and a purge loop connection and a delivery line connection positioned at the other side of the wall.

For sequential operation of the individual beds of the two bed sets 10 and 20, the sequencer unit 100 comprises a solid state three channel timer unit having three relays connected so as sequentially to switch the solenoids of the bleed switching valves 47, 48, 49 of bed set 10, and the corresponding valves of bed set 20 in synchronisation with the switching of valves 47, 48, 49 but so as to operate the corresponding valves in antiphase to the valves 47, 48, 49.

In this aircraft application, the system delivers oxygen-enriched air as breathable gas to aircrew usually by way of oronasal breathing masks. Supply air is obtained from the engine source 14 of the aircraft and fed into the supply line 16 to the sieve beds by way of filters 15 disposed upstream of suitable pressure control valves 17 which, for example, may be set to open to a source pressure of 276 kPa (40 psi) and control at 310 kPa (45 psig). The delivery line 18 feeds to an oronasal breathing mask (not shown) by way of a demand type breathable gas regulator of suitable form (not shown), upstream of which is a standby pressurised breathable gas source (not shown), such as an oxygen cylinder for providing 100% oxygen deliverable to the regulator in conditions of low supply-air pressure, low cabin pressure or low concentration (partial pressure) of oxygen in the product gas delivered from the molecular sieve beds. The standby gas source may be activated by any suitable monitor/activator system.

In the illustrated embodiment, the beds 11, 12, 13 are placed on-stream and regenerated in alternating and overlapping sequence by operation of the valve arrangements 30 in which the solenoid operated switching valves 47, 48, 49 are controlled by the sequencer unit 100 alternately to open and close the charge and vent ports of their respective beds by alternate connection of the servo chamber of the charge valves 41, 42, 43 and vent valves 44, 45, 46 to ambient. As previously stated, the sequencer is arranged to control the charge and vent valves such that they are open for equal periods of time.

Figure 2:
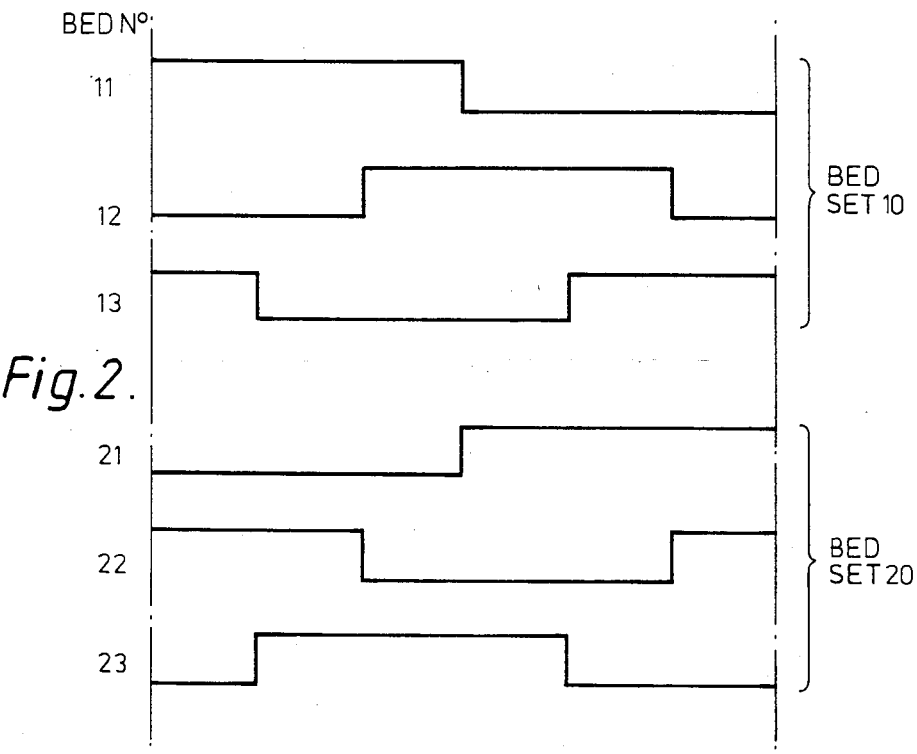
FIG. 2 is a diagram showing the sequence of the bed sets of FIG. 1 when operated in antiphase.

The time of opening of all the valves and the overlapping relationship of the three bed cycles in each bed set is best understood with reference to FIG. 2. With the opening of the charge valve 41 of, nominally, the first bed 11 in sequence, when the switching valve 47 is holding servo pressure in the vent valve 44 and releasing it from the charge valve 41, supply air is fed into the bed wherein nitrogen is adsorbed by the molecular sieve material and oxygen-enriched air is passed into the delivery line 18 on opening of the valve 31. At the end of the period of charging and delivering product gas, that is half of the way through the bed cycle, the switching valve 47 is reversed to close the charge valve 41 and open the vent valve 44, whereupon the bed 11 becomes open to ambient and discharges thereinto so commencing desorption of nitrogen from the sieve material while reducing the pressure in the bed 11 and in that part of section 34c of the purge loop 34 which is downstream of the check valve 39. Reduction of pressure in section 34c allows initial stage product gas from the overlapping, sequentially second, bed 12 to pass the check valve 39 and flow into bed 11 to purge it clean.

Thus compressed supply air is admitted cyclically to the beds 11, 12, 13 and 21, 22, 23 by way of the respective sequencer-controlled valve arrangements 30 and when a bed is on-stream, oxygen-enriched air flows from the bed into the delivery line, but shortly after switching of the charge and vent valves to opposite mode the bed is purged by new product gas from one of the other beds coming on-stream. Thus product gas from bed 11 purges bed 13, product gas from bed 12 purges bed 11 and product gas from bed 13 purges bed 12, whereas product gas from bed 21 purges bed 23, product gas from bed 22 purges bed 21 and product gas from bed 23 purges bed 22. Evenness of flow is not lost during the withdrawal of some product gas from one bed for the purpose of purging another bed because the remaining bed in each bed set still continues to deliver product gas during this period.

The partial pressure of oxygen in the oxygen-enriched product gas changes with change in pressure of the ambient condition to which the bed is vented during regeneration so that the concentration of oxygen increases with (although not as fast as) reducing ambient pressure owing to the efficiency of desorption of nitrogen from the sieve material increasing. Thus the concentration of oxygen in the product gas automatically remains satisfactory for most presently known operational requirements up to a cabin altitude (pressure) of 4,500 meters (15,000 feet).

Whilst the embodiment of FIG. 1 shows a system that incorporates a single pair of bed sets coupled in parallel, in other embodiments of the invention there may be two or more pairs of bed sets organised as in FIG. 1 and arranged in parallel between the supply line and the delivery line. Each pair of bed sets may have an individual controller or there may be a controller controlling operation of all of the bed sets. Operation of the bed sets may be arranged such that each pair of bed sets is run at its own cycle time or the pairs of bed sets may all be synchronised so that their respective bed cycle sequences are either in unison or interleaved in time.

A system as shown in FIG. 1 comprising two three-bed sets 10 and 20, respectively, coupled together in parallel with the two product outlets connected into a common delivery line, was tested in our high altitude laboratory.

The inlets of the bed sets were supplied with air at separately controlled pressures so that the performance of the sets could be separately determined with balanced and unbalanced inlet pressures, and with different supply pressures.

The solenoids controlling the valves of the beds were wired to a programmable multi-channel controller to enable the effect of different bed sequences to be assessed.

With charge and vent times equal at 4.5 seconds each, the three beds of each bed set were operated with overlapping cycles time-spaced at equal intervals, (i.e. one bed commenced its cycle every three seconds in a nine-second total cycle).

The two sets were first operated individually with the timing as shown for bed set 10 in FIG. 2, at 210 kPa (30 psig) supply and flows up to 100 liters/min., so that the performance of the bed sets when coupled could be compared. The oxygen concentrations and product pressures were recorded.

The two bed sets 10 and 20 were then coupled so that they ran synchronously but in antiphase, i.e. the beds of bed set 20 were operated in synchronism but with the opposite phase to the corresponding beds of bed set 10. The resultant complete timing sequence is shown in FIG. 2, showing that, for instance, bed 21 is switched to vent simultaneously with the switching of bed 11 to charge.

The performance of the system was recorded at 210 kPa (30 psig) supply and flow up to 200 liters/min. FIG. 4 shows the oxygen concentrations obtained for each individual bed set up to a product gas flow of 100 l/min., and for the two bed sets when coupled in parallel and run synchronously in antiphase for a product gas flow up to 200 liters/min. It can be seen that the oxygen concentration obtained from the coupled bed sets compares very favourably with that of the individual bed sets at the appropriate flows, whilst FIG. 5 shows that the outlet pressure swings of the six beds running synchronously in antiphase are considerably smaller than those of the individual bed sets.

Figure 3:
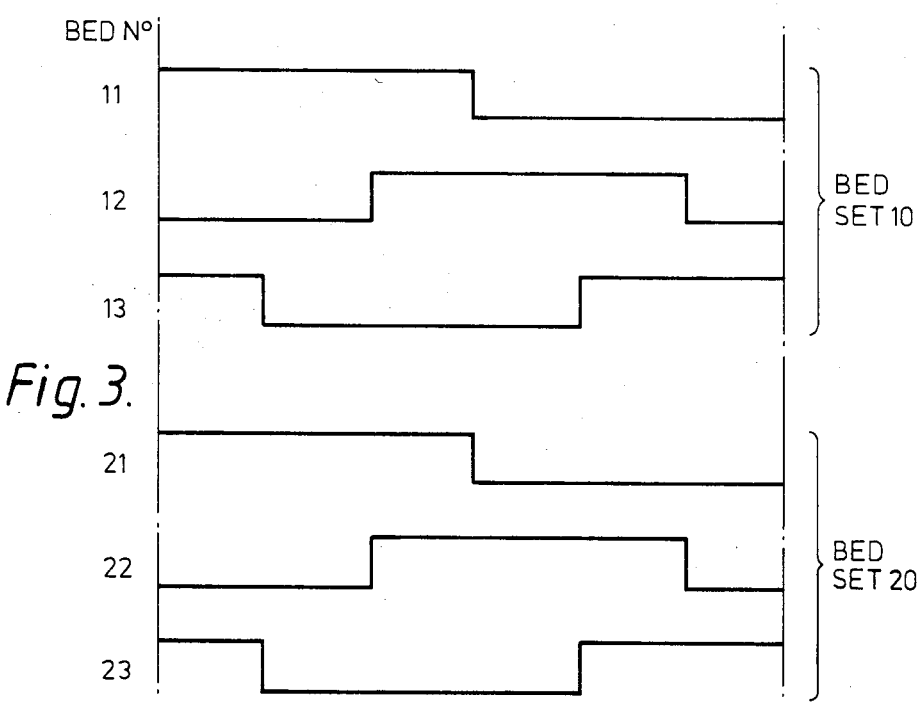
FIG. 3 is a diagram showing the sequence of the bed sets of FIG. 1 when operated with phase synchronisation.

The tests on the coupled bed sets were repeated with the solenoids of the bed sets connected in parallel so that they were running synchronously and with corresponding beds in-phase in a three-bed sequence as shown in FIG. 3 instead of the six-bed antiphase sequence shown in FIG. 2. Oxygen concentrations and outlet pressures were recorded at an inlet pressure of 210 kPa (30 psig) and flows up to 200 liters/min. and this test also showed that the six-bed antiphase sequence results in improved oxygen concentration and considerably smaller outlet pressure swings.

The tests were repeated with different pressures supplied to the bed sets, firstly with 210 kPa (30 psig) applied to bed set 10 and 195 kPa (28 psig) to bed set 20 and then with the supply pressures reversed. In each case, the effect of the three-bed in-phase and six-bed antiphase sequences was determined.

The resultant oxygen concentrations and outlet pressures showed that when using the three-bed in-phase synchronous sequence, there is a marked fall in oxygen concentrations especially around 50 liters/min. N.T.P. demand flow, but that this is not so with the six-bed antiphase sequence.

What is claimed is:

1. In a method of operating a molecular sieve type gas separation system to deliver oxygen-enriched air to an outlet, the system including a pair of sieve bed sets and control means for cyclically subjecting each sieve bed to a charge/adsorption on-stream phase followed by a purge/desorption regeneration phase, the method including the steps of operating the individual sieve beds of each sieve bed set in overlapping sequence with respect to each other and operating the individual sieve beds of one set synchronously with respect to the sieve beds of the other set but in antiphase so that when one sieve bed in one set is switched to a charge/adsorption on-stream phase the corresponding sieve bed in the other set is switched to a purge/desorption regeneration phase whereby enhanced oxygen concentrations and smaller outlet pressure swings are achieved by the separation system.

2. A molecular sieve type gas separation system adapted to deliver oxygen-enriched air for breathing by aircrew of an aircraft by decreasing the nitrogen content of air fed into the system, comprising two bed sets each comprising three molecular sieve beds;
a supply line for delivering air from an air supply source to the sieve beds;
a respective charge valve connecting a charge inlet port of each sieve bed with the supply line;
a respective vent valve connecting a vent port of each bed with ambient atmospheric pressure or a pressure related thereto;
a respective solenoid operated bleed switching valve connected with the charge and vent valves of each bed and adapted for switching the charge and vent valves between open and closed positions such that when the charge valve is open the vent valve is closed and vice versa;
a sequencer unit connected with the solenoid operated bleed switching valves and adapted to control the solenoid operated bleed switching valves to sequentially switch the charge and vent valves of the beds of each bed set between the open and closed positions such that the open period of a charge valve is equal to the open period of a vent valve and the open periods of the charge and vent valves of one of the beds in a bed overlap the closed periods of the charge and vent valves of the other beds in the bed set, the sequencer unit being further adapted to control the solenoid operated bleed switching valves to switch the charge and vent valves of the beds of one bed set in synchronisation with the charge and vent valves of the beds of the other bed set but in anti-phase thereto.

3. A molecular sieve type gas separation system according to claim 2, wherein the sequencer unit comprises a solid state three channel timer unit having three relays connected so as to sequentially switch the solenoid operated bleed switching valves.

4. A molecular sieve type gas separation system according to claim 2, wherein respective servo chambers of the charge valves and the vent valves are connected to the supply line and to the solenoid operated bleed switching valves.

* * * * *